(12) United States Patent
Taylor

(10) Patent No.: US 10,301,049 B2
(45) Date of Patent: May 28, 2019

(54) SEALING JAWS FOR A PACKAGING MACHINE

(71) Applicant: TNA Australia Pty Limited, Homebush Bay (AU)

(72) Inventor: Alfred Alexander Taylor, Lugarno (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 986 days.

(21) Appl. No.: 14/506,219

(22) Filed: Oct. 3, 2014

(65) Prior Publication Data

US 2015/0135653 A1    May 21, 2015

(30) Foreign Application Priority Data

Nov. 19, 2013  (AU) ................................ 2013904470

(51) Int. Cl.
*B65B 51/30*        (2006.01)
*B65B 41/10*        (2006.01)
(Continued)

(52) U.S. Cl.
CPC ............ *B65B 51/306* (2013.01); *B65B 9/207* (2013.01); *B65B 9/2028* (2013.01); *B65B 41/10* (2013.01); *B29C 65/02* (2013.01); *B29C 65/18* (2013.01); *B29C 65/7847* (2013.01); *B29C 65/7888* (2013.01); *B29C 66/1122* (2013.01); *B29C 66/4312* (2013.01); *B29C 66/4322* (2013.01); *B29C 66/83513* (2013.01);
(Continued)

(58) Field of Classification Search
CPC ..... B65B 51/306; B65B 9/2028; B65B 9/207; B65B 41/10; B29C 65/02; B29C 65/18; B29C 65/7847; B29C 65/7888; B29C 66/1122; B29C 66/4312; B29C 66/4322; B29C 66/83513
USPC .......................................................... 53/551
See application file for complete search history.

(56) References Cited

U.S. PATENT DOCUMENTS

| | | | | |
|---|---|---|---|---|
| 3,525,193 | A | * | 8/1970 | Cutler ..................... B65B 9/213 53/437 |
| 4,525,977 | A | * | 7/1985 | Matt ....................... B65B 9/067 53/450 |

(Continued)

FOREIGN PATENT DOCUMENTS

| | | |
|---|---|---|
| AU | 2012201494 A1 | 10/2012 |
| AU | 2012201595 A1 | 11/2012 |

(Continued)

OTHER PUBLICATIONS

Search and Examination Report issued in corresponding British Application No. GB 1 416 922.1 dated Nov. 1, 2016 (five pages).
(Continued)

*Primary Examiner* — Alexander M Valvis
*Assistant Examiner* — Lucas E. A. Palmer
(74) *Attorney, Agent, or Firm* — Kilpatrick Townsend & Stockton LLP

(57) ABSTRACT

A packaging assembly (10) including a weighing machine (11) that includes buckets (12, 13) to provide batches of product to be delivered to a former (41), with the former (41) delivering tubular bag material with product to a packaging machine (18). The tubular bag material is delivered to the packaging machine (18) by means of a film drive assembly (17).

19 Claims, 4 Drawing Sheets

(51) Int. Cl.
  *B65B 9/207* (2012.01)
  *B65B 9/20* (2012.01)
  *B29C 65/78* (2006.01)
  *B29C 65/18* (2006.01)
  *B29C 65/00* (2006.01)
  *B29C 65/02* (2006.01)

(52) U.S. Cl.
  CPC ...... *B29C 66/849* (2013.01); *B29C 66/93441* (2013.01); *B29C 66/93451* (2013.01)

(56) References Cited

U.S. PATENT DOCUMENTS

| | | | |
|---|---|---|---|
| 4,663,917 A | 5/1987 | Taylor et al. | |
| 4,727,707 A * | 3/1988 | Hadden | B65B 9/2028 53/451 |
| 4,750,313 A * | 6/1988 | Kammler | B65B 9/2028 53/451 |
| 4,753,336 A | 6/1988 | Taylor et al. | |
| 4,825,623 A * | 5/1989 | Ross | B65B 9/2028 53/437 |
| 4,910,943 A * | 3/1990 | Taylor | B65B 9/20 226/95 |
| 5,279,098 A * | 1/1994 | Fukuda | B29C 65/18 53/374.6 |
| 5,345,750 A * | 9/1994 | Gries | B29C 65/18 53/374.4 |
| 5,347,795 A * | 9/1994 | Fukuda | B29C 65/18 53/373.7 |
| 5,377,474 A * | 1/1995 | Kovacs | B65B 9/2028 53/451 |
| 5,412,927 A * | 5/1995 | Miyazaki | B29C 65/1412 53/374.3 |
| 5,485,712 A * | 1/1996 | Cherney | B65B 9/2028 53/436 |
| 5,540,035 A * | 7/1996 | Plahm | B65B 9/20 53/450 |
| 5,622,032 A * | 4/1997 | Ryan | B29C 66/7373 53/374.9 |
| 5,724,792 A * | 3/1998 | Domke | B65B 1/22 53/525 |
| 5,753,067 A * | 5/1998 | Fukuda | B65B 9/2028 156/358 |
| 6,052,971 A * | 4/2000 | Malsam | B65B 51/303 53/451 |
| 6,119,438 A * | 9/2000 | Bacon | B65B 9/20 53/451 |
| 6,158,200 A * | 12/2000 | Taylor | B65B 1/22 53/451 |
| 6,170,227 B1 * | 1/2001 | Kovacs | B31D 5/0073 53/375.9 |
| 6,178,726 B1 * | 1/2001 | Takigawa | B29C 65/18 53/374.6 |
| 6,250,048 B1 * | 6/2001 | Linkiewicz | B65B 9/2028 156/497 |
| 6,463,720 B1 * | 10/2002 | Cherney | B65B 1/22 53/437 |
| 6,655,110 B2 * | 12/2003 | Taylor | B65B 9/20 53/373.9 |
| 7,124,559 B2 * | 10/2006 | Taylor | B65B 9/22 53/201 |
| 7,152,387 B2 * | 12/2006 | Taylor | B65B 9/22 493/302 |
| 7,159,376 B2 * | 1/2007 | Taylor | B65B 51/306 53/374.9 |
| 7,383,672 B2 * | 6/2008 | Taylor | B65B 15/04 53/134.1 |
| 7,415,809 B2 | 8/2008 | Taylor | |
| 7,472,528 B2 * | 1/2009 | Taylor | B65B 9/2021 53/451 |
| 7,559,184 B2 * | 7/2009 | Grzonka | B65B 9/2021 53/451 |
| 7,600,630 B2 * | 10/2009 | Taylor | B65B 35/26 198/470.1 |
| 8,567,165 B2 * | 10/2013 | Bierschenk | B65B 9/20 53/439 |
| 8,656,690 B2 * | 2/2014 | Bierschenk | B65B 1/22 53/437 |
| 2002/0162305 A1 * | 11/2002 | Miyamoto | B65B 9/15 53/526 |
| 2003/0046905 A1 * | 3/2003 | Kaechele | B29C 65/7439 53/459 |
| 2010/0101193 A1 * | 4/2010 | Iwasa | B65B 9/20 53/567 |
| 2010/0199613 A1 * | 8/2010 | Miyamoto | B29C 65/18 53/548 |
| 2012/0204514 A1 * | 8/2012 | Miyamoto | B65B 1/22 53/235 |
| 2012/0204515 A1 * | 8/2012 | Miyamoto | B65B 1/22 53/266.1 |
| 2013/0186926 A1 * | 7/2013 | Taylor | B65B 41/00 226/95 |
| 2015/0135654 A1 * | 5/2015 | Taylor | B65B 9/2028 53/551 |

FOREIGN PATENT DOCUMENTS

| | | |
|---|---|---|
| AU | 2012258403 A1 | 6/2013 |
| AU | 2012258497 A1 | 6/2013 |
| EP | 0375857 A1 | 7/1990 |
| EP | 0 469 819 A1 | 2/1992 |
| GB | 1479416 A | 7/1977 |
| GB | 2262079 A | 6/1993 |
| GB | 2279637 A | 1/1995 |
| GB | 2497417 A | 6/2013 |
| JP | S54-133992 A | 10/1979 |
| JP | H05-4609 A | 1/1993 |
| JP | H09-175514 A | 7/1997 |
| JP | 2012-126447 A | 7/2012 |
| WO | 2013/164985 A1 | 11/2013 |

OTHER PUBLICATIONS

Search Report dated Mar. 10, 2015, from United Kingdom Patent Application No. GB1416922.1 (6 pages).
Search report from corresponding Spanish application No. 201431697, dated Feb. 18, 2016 (four pages).
British Examination Report dated Jun. 8, 2018 from corresponding British Patent Application No. GB1416922.1 (four pages).

* cited by examiner

SEALING JAWS FOR A PACKAGING MACHINE

CROSS-REFERENCE TO RELATED APPLICATIONS

This application claims the priority of Australian Provisional Patent Application No. 2013904470, filed Nov. 19, 2013, the disclosure of which is incorporated herein by reference.

FIELD

The present invention relates to packaging machines and more particularly to sealing jaws for packaging machines.

BACKGROUND

Packaging machines receive bag material in tubular form. Product to be packaged is delivered to the interior of the tubular bag material, with the packaging machine then transversely sealing and cutting the tubular bag material to form bags of product. The tubular bag material is formed by a former shoulder, to which packaging film is delivered in strip form. Formers and packaging machines are described in U.S. Pat. Nos. 4,910,943, 5,622,032, 4,663,917, 6,655,110, 7,159,376, 7,600,630, 7,383,672, 4,753,336, 7,124,559, 7,415,809, 7,152,387 and 7,472,528, and Australian Patent Applications 2012258403, 20122584, 2012258497, 2012201494 and 2012201595.

The tubular material provided by the former shoulder is longitudinally sealed. This function is performed by heating the tubular bag material along its longitudinally overlapping edges and by applying pressure to the overlapping longitudinal edges.

Located above the former is a weighing machine that delivers batches of product to a sleeve that extends to the former, with an internal sleeve extending from the central opening of the former to a position adjacent or below the lower edge of the former.

The tubular bag material passes the former that provides the former shoulder, is longitudinally sealed and then delivered to the packaging machine. While this is occurring batches of product are delivered to the interior of the tubular bag material by the weigher, the batches consisting of product scattered along a length of the tubular bag material. A film drive assembly is located below the former and above the packaging machine. The film drive assembly engages the tubular bag material to cause the strip material to pass over the former, and delivers the tubular bag material to the packaging machine below. Typically the film drive unit includes a pair of driven belts (or rollers) that drive the tubular bag material at a desired velocity. The packaging machine includes at least a pair of rotatably driven jaws, with the jaws having a peripheral speed (when engaged with the tubular bag material) that matches the velocity of the tubular bag material as determined by the film drive assembly.

The disadvantage of the above discussed machines is that due to the length of each product batch, the packaging machine is limited in respect of the number of bags it can produce per minute.

Product leaving the weighing machine, as mentioned above, is arranged in batches. It is not unusual for the batches to have a length of 100 ms when leaving the weighing machine. However the batches follow an arcuate path as they enter the former. This causes the product to impact against itself, and the internal surfaces of the tubular bag material. The result is that the product batches increase in length. As an example the batch length may increase to 600 ms. To ensure the product is not located between the sealing jaws, it is assumed, in programming the packaging machine, that the product batches have a length of about 650 ms.

The batches become elongated as the product falls through the former to the packaging machine below. The greater this fall length, the greater the batch elongation.

The elongated batches create a further problem in that it becomes difficult to minimise the volume of product in the bags being formed.

It is therefore a disadvantage of known packaging assemblies that the packaging machines cannot operate at maximum speed due to undesirable batch elongation.

OBJECT

It is the object of the present invention to overcome or substantially ameliorate at least one of the above disadvantages.

SUMMARY

There is disclosed herein a packaging machine to receive tubular bag material and product to produce bags of product, the material moving at a velocity in a predetermined direction relative to the machine, the machine including:

a pair of sealing jaws rotatably driven in unison through repeated revolutions in opposite angular directions, the jaws being driven about spaced generally parallel axes generally transverse relative to said direction so that each jaw has an angular velocity about a respective one of the axes;

jaw supports to which the jaws are attached so as to be driven thereby; and a control and motor assembly drivingly coupled to supports and therefore the jaws to cause the rotation of the supports, said assembly being operable to change the angular velocity of the supports so that when the jaws are adjacent each other, to engage the tubular bag material, the jaws have a peripheral velocity in said direction that can be altered.

Preferably, said control and motor assembly is operable to reverse the direction of rotation of the supports and therefore the sealing jaws, so that the sealing jaws move in an opposite angular direction when adjacent each other, to engage the tubular bag material.

There is disclosed herein, in combination a film drive assembly and a packaging machine that receives tubular bag material from the film drive assembly:

the film drive assembly including a plurality of rollers of which one is a drive pulley, and a belt of loop configuration passing about the rollers, so as to be driven thereby, so as to provide a belt drive portion that engages the tubular bag material to move the tubular bag material in a predetermined direction, at the drive assembly, for delivery to the packaging machine:

the packaging machine including:

a pair of sealing jaws rotatably driven in unison through repeated revolutions in opposite angular directions, the jaws being driven about spaced generally parallel axes generally transverse relative to said direction so as to each have an angular velocity, with the sealing jaws engaging the tubular bag material to transversely seal the tubular bag material to form bags of product; and wherein there are motors operatively associated with the film drive assembly and the packaging machine to cause operation of the belt and sealing jaws, with the combination further including a control operatively associated with the motors to cause operation thereof, the control being operable so that the motors drive the belt and jaws so that the jaws when adjacent each other, to engage the tubular bag material, can have a peripheral velocity less than the velocity of the belt of the film drive assembly.

Preferably, the motors include servo motors, with at least one servo motor driving the driven roller, and at least one servo motor driving the sealing jaws, with the control being a computer programmed to operate the servo motors so that belt provides the tubular bag material with a predetermined velocity, and the servo motor driving the sealing jaws is operated so that the sealing jaws can have a peripheral velocity less than said predetermined velocity.

Preferably, said peripheral velocity can be in a direction opposite said predetermined direction.

Preferably, the belt has a drive surface to frictionally engage the material, the belt moving along a predetermined path including a generally linear first path portion along which the drive surface engages the material, the belt having a plurality of passages extending transversely through the belt from said surface;

a manifold to be subjected to a reduced air pressure and communicating with the passages for at least a part of said path portion so that the passages are subjected to a reduced air pressure so that a difference in air pressure across the material urges the material against said surface at said first path portion;

the drive pulley is engaged with the belt to cause the belt to move along said path in a predetermined direction; and said belt passing between the a first one of said rollers and a second one to said rollers, to provide said first path portion, with the first and second rollers and drive pulley co-operating to provide a second path portion and a third path portion, with the second and third path portions relative to said first path portion having a direction of extension away from said first path portion.

Preferably, the first and second rollers are idler rollers.

Preferably, the second and third portions are linear.

Preferably, the assembly includes a heating bar at said first path portion to heat the bag material.

Preferably, said belt is a first belt, and said assembly includes a second belt, the second belt being generally parallel to the first belt at said first path portion and including a drive surface and a plurality of passages extending transversely of the second belt from the drive surface of the second belt, with the passages of the second belt communicating with the manifold so that the passages of the second belt are also subjected to a reduced air pressure to urge the bag material into engagement with the second belt.

Preferably, the second belt passes around a second drive roller and a third and a second fourth idler rollers.

Preferably, the second drive pulley has a radius, and each of the third and fourth idler rollers has a radius, with the second drive pulley radius being greater than the third and fourth idler roller radius.

Preferably, the first idler roller is approximately vertically above the second idler roller.

Preferably, the second path portion extends between the second idler roller and the drive pulley of the first belt, with the second path portion extending generally horizontally.

Preferably, the drive assembly includes a further idler roller, the further idler roller or rollers urging the belts into engagement with the drive pulleys.

Preferably, the former includes a former shoulder constructed of sheet material providing a hollow and a former lower edge portion, with the former shoulder having an external surface that receives strip bag material to form the strip bag material into tubular bag material that is moved from the former in a predetermined direction; and wherein the rollers include an upper roller and a lower roller, with said upper roller at least partly projecting higher than said lower edge portion.

Preferably, the upper roller extends into said hollow.

BRIEF DESCRIPTION OF DRAWINGS

Preferred forms of the present invention will now be described by way of example with reference to the accompanying drawings wherein.

DESCRIPTION OF EMBODIMENTS

Figure 1:
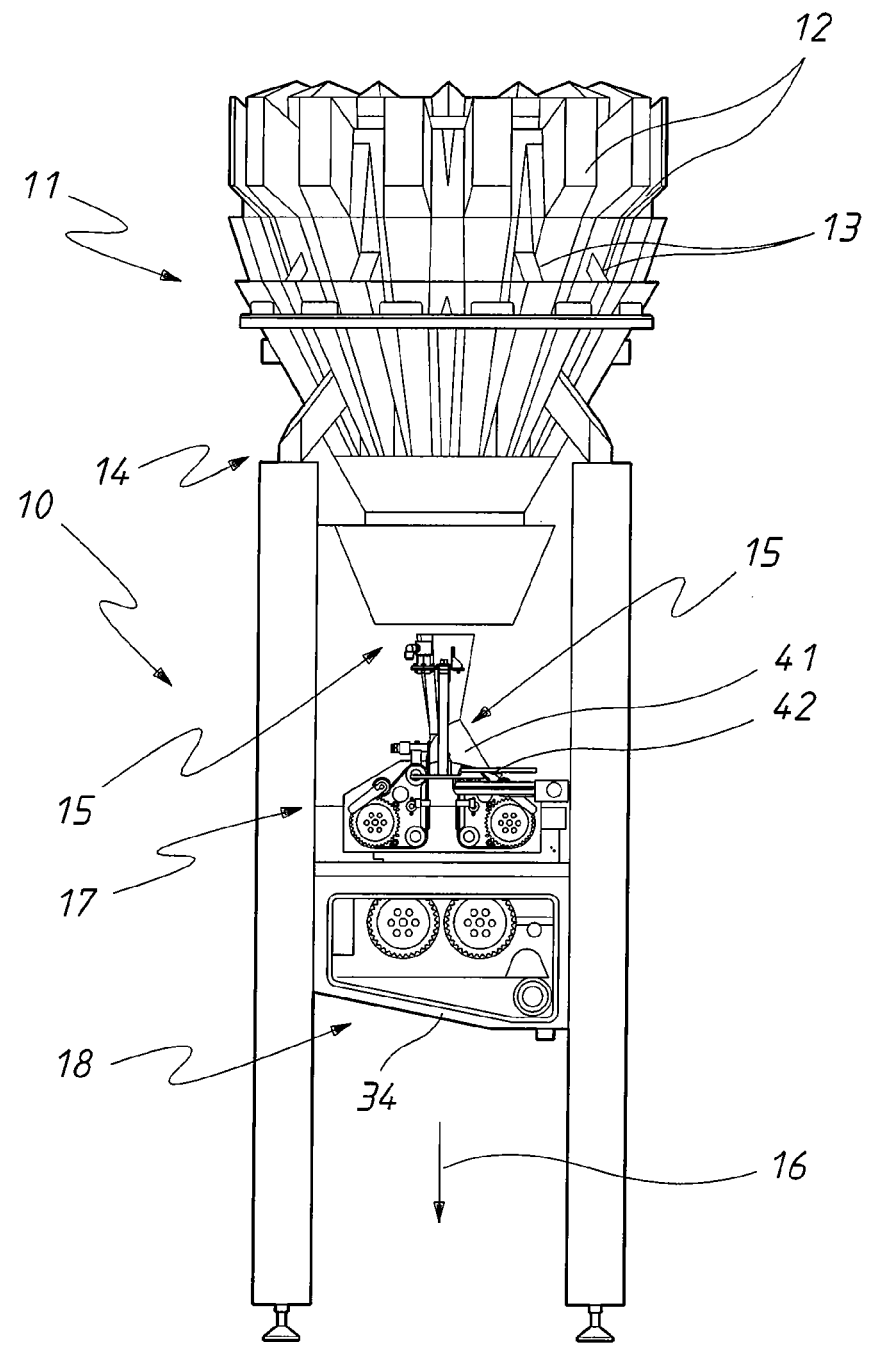
FIG. 1 is a schematic side elevation of a packaging assembly.

In the accompanying drawings there is schematically depicted a packaging assembly 10. The assembly 10 includes a weighing machine 11 that includes a plurality of buckets 12 and 13 to which product is delivered from above, with the buckets 12 and 13 being operated to deliver batches of product to a chute 14. The chutes 14 deliver the batches of product to a former shoulder 15. The former shoulder 15 has a former 41 that receives strip bag material, and transforms the strip bag material into a tubular configuration that passes in the direction 16. The strip bag material engages the external surface of the former 41 to be configured into a tubular form. The tubular bag material passes downwardly from the upper opening the former 41. The direction 16 is generally vertically downward.

The tubular bag material 27 is engaged by a film drive assembly 17 that pulls the strip material past the former shoulder 41, and delivers the tubular bag material 27 to the packaging machine 18 below.

The drive assembly 17 includes a pair of sub-assemblies 19, the sub-assemblies 19 being located on opposite sides of the tubular bag material 27 and both engage the tubular bag material 27 to pull the tubular bag material 27 through the assembly 10.

Each sub-assembly 19 includes a belt 20 that passes between a first idler roller 21, a second idler roller 22 and a drive pulley 23. The length of belt 20 passing between the idler rollers 21 and 22 provides a belt drive portion 24 that is generally linear and parallel to the direction 16. The portion 24 moves in the direction 16 so as to move the tubular bag material in the direction 16.

The belt 20 passes from the idler roller 22 to the drive pulley (roller) 23 so as to provide second belt portion 25. The belt portion 25 is generally horizontal, that is generally perpendicular (transverse) relative to the direction 16. The belt 20 passes about the pulley 23 to the idler roller 21 so as to provide a belt portion 35.

The belt portion 24 follows a linear path generally parallel to the direction 16 and direction of extension of the tubular bag material 27. The belt portion 25 follows a generally linear path extending away from the tubular bag material 27 (and portion 24), so as to have a direction of extension away from the portions 24. The belt portion 35 has a direction of extension away from the belt portion 24.

The belt 20 passes in the direction 26 about the idler rollers 21 and 22 and drive pulley 23. The two belt portions 24 are generally parallel co-extensive but transversely spaced so as to be on opposite sides of the tubular bag material 27.

The drive pulleys 23 are driven by control and motor assembly 44 so as to provide the tubular bag material 27 with a desired velocity profile. As mentioned previously, the tubular bag material 27 is driven in the direction 16. However in a further preferred form the control and motor assembly 44 may vary the velocity in the direction 16, and more preferably can reverse movement of the tubular bag material 27, so that for one or more short periods of time the tubular bag material 27 is slowed or even moves in a direction opposite the direction 16. This movement causes the tubular bag material 27 to vibrate, aiding in causing the product to settle towards the lower end of the bag being formed. The control and motor assembly 44 would include a computer controlled servo motor for each pulley 23.

The abovementioned sub-assemblies 19 provide a particular advantage in that the idler rollers 21 and 22 are of a small diameter than the drive pulley 23, which in turn enables the distance between the former 15 and packaging machine 18 to be reduced. This reduced length minimises the length of which the product batches can elongate. This in turn enables the machine 18 to be operated at a higher speed, therefore providing for an increase in the number of bags produced per minute.

The belts 20 of the above described preferred embodiment, each have passages 40 extending transversely through the belt 20, with the passages 40 communicating with a manifold 28. Reduced air pressure is delivered to the manifolds 28, with the result that a reduced pressure is applied to the passages 40 extending transversely through the belt 20, thereby urging the tubular bag material 27 into contact with the first belt portions 24. In particular the manifolds 28 would communicate with the passages 40 along the first belt portion 24. To sealingly secure together the longitudinal edge portions of the bag material (to form the tubular bag material 27, there is provided a heating bar (sealing) not illustrated. Preferably there is further provided a third idler roller 29 that is mounted on a pivotally movable arm 30 so that the roller 29 is urged in contact with the belt 20 which in turn urges the belt 20 into contact with the drive pulley 23.

Preferably, the idler rollers 21 and 22 have generally parallel rotational axes that are transverse relative to the direction 16, while the idler rollers 21 and 22 have axes that are generally parallel to the rotational axes of the drive pulleys 23.

Figure 2:
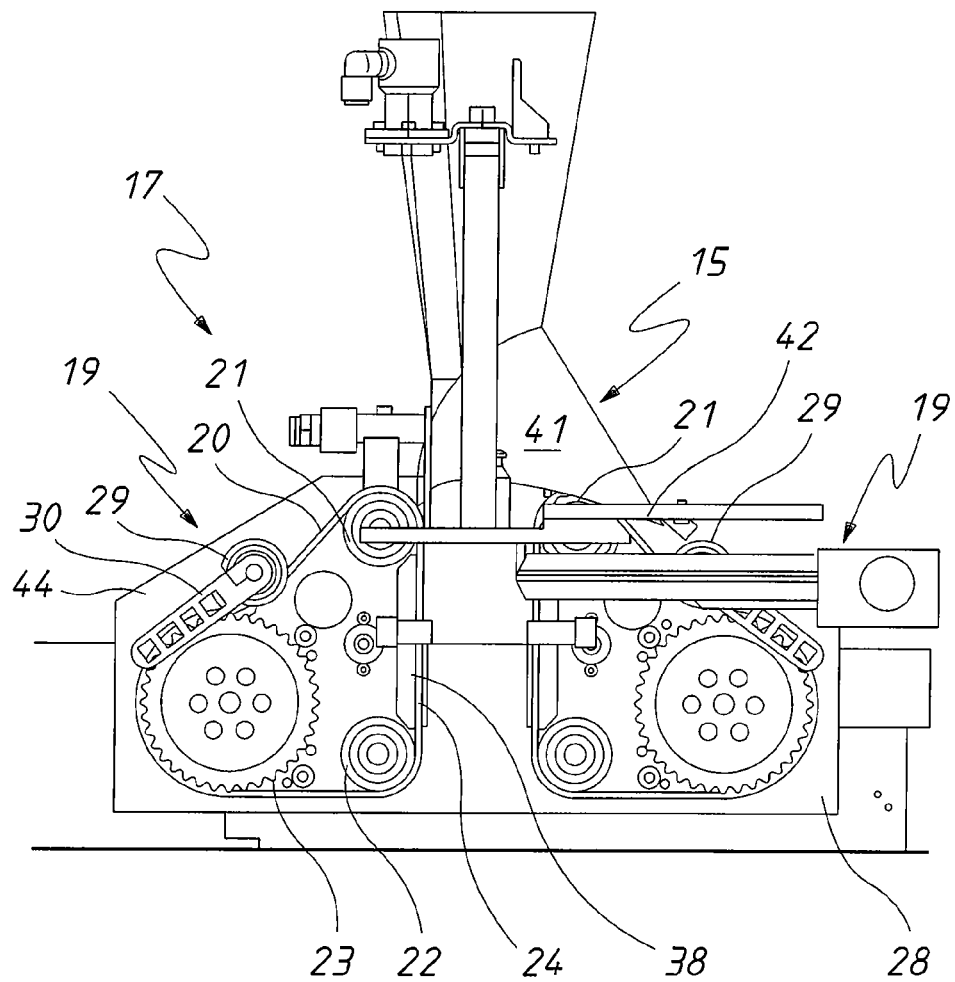
FIG. 2 is a schematic side elevation of the drive assembly of the packaging assembly of FIG. 1.

In the embodiment of FIGS. 1 and 2, the upper roller 21 projects above the lower edge portion 42 of the former 41. This has the specific advantage of reducing the distance between the former 41 and the packaging machine 18, thereby minimising batch elongation as discussed above.

Figure 3:
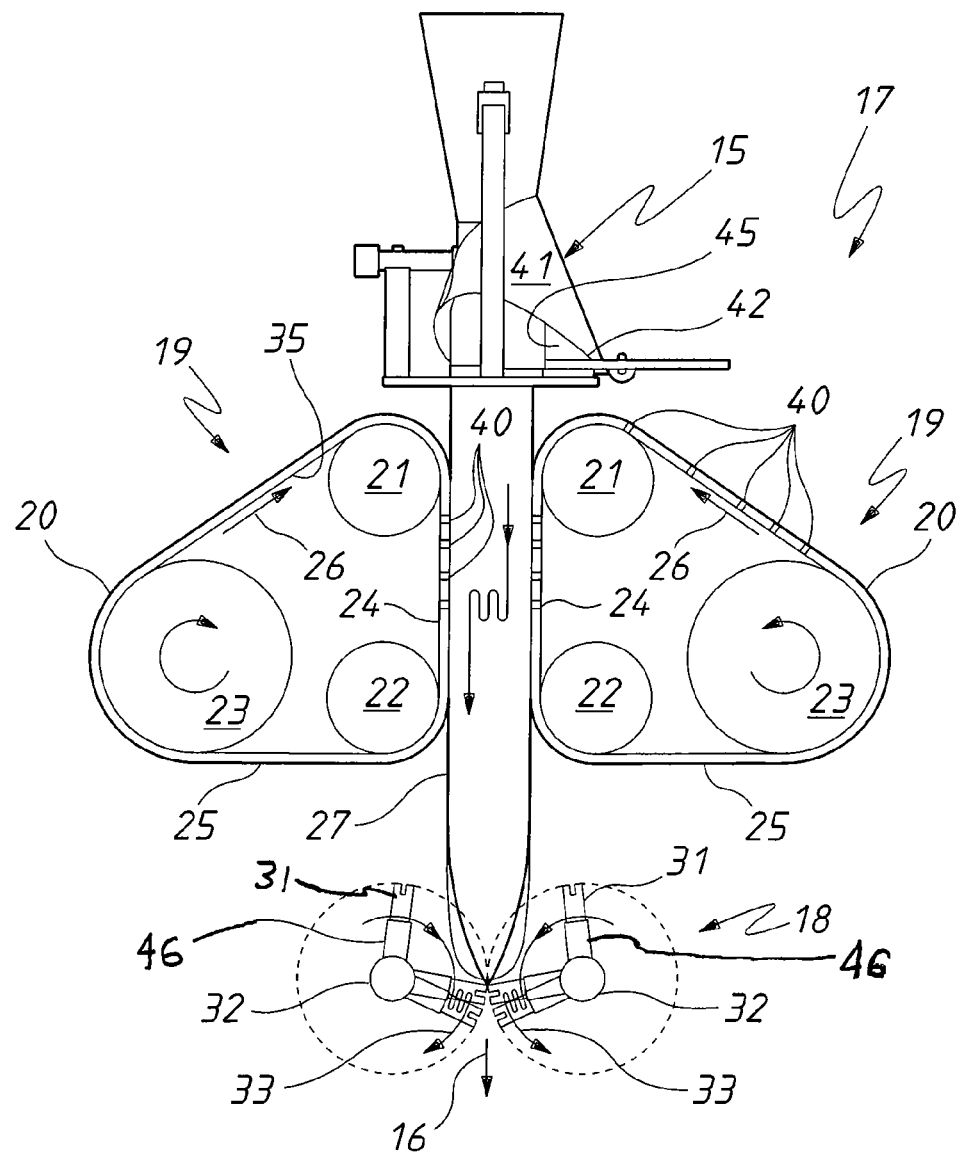
FIG. 3 is a schematic side elevation of a modification of the drive assembly as shown in FIG. 2.
Figure 4:
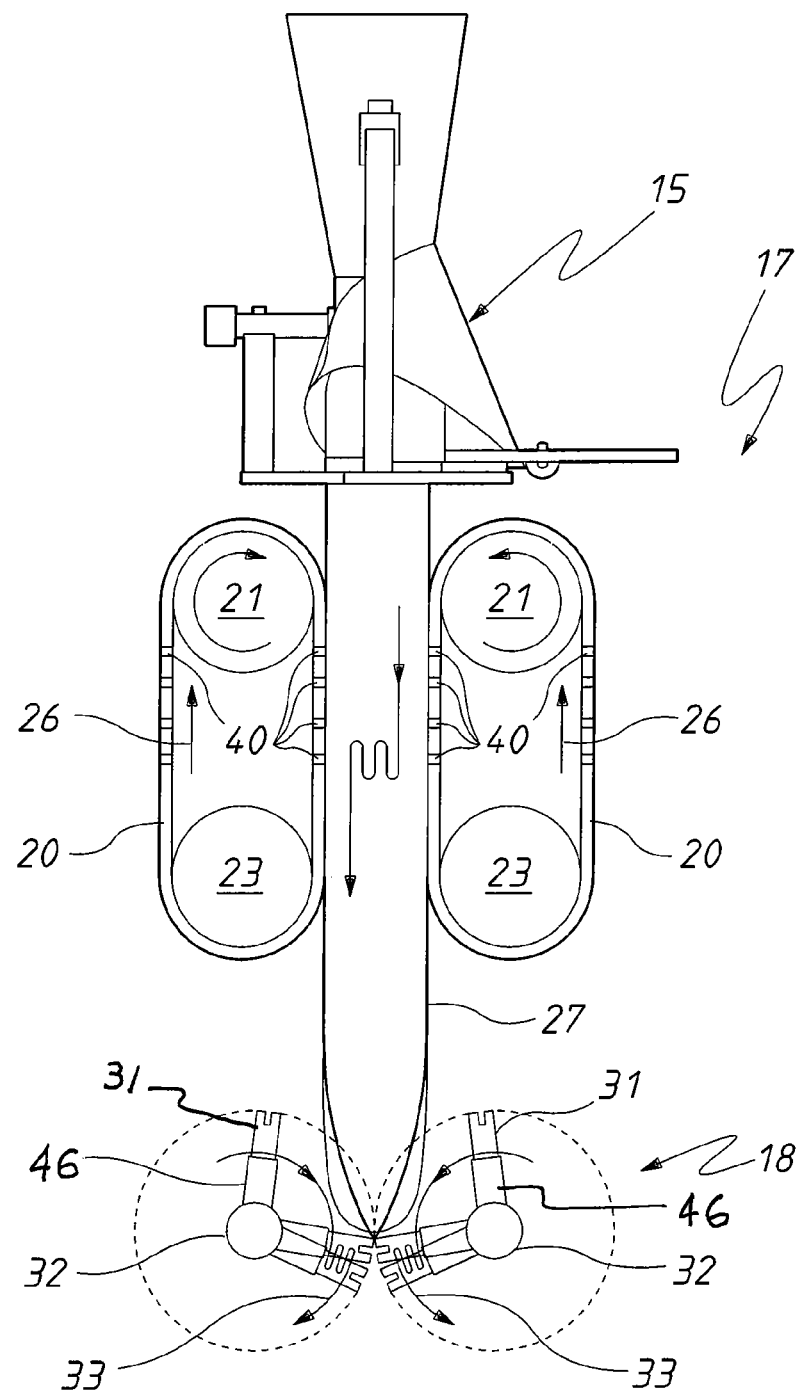
FIG. 4 is a schematic side elevation of a further modification of the drive assembly of FIGS. 2 and 3.

In the embodiment of FIGS. 3 and 4, the upper rollers 21 have been increased in size and removed from projecting above the lower edge portion 42. However it should be appreciated that in respect of the embodiments of FIGS. 3 and 4, the upper rollers 21 could be reduced in size and moved upward so as to be located at least partly in the hollow 45 provided by the former 41, that is at least partly projecting above the lower edge portion 42.

The packaging machine 18 includes a pair of rotatably driven sealing jaws 31. Each of the jaws 31 is mounted on a jaw support (arm) 45 fixed to a shaft 32, with the shafts 32 being rotatably driven in opposite angular directions 33. Accordingly the sealing jaws 31 are driven through repeated revolutions in synchronism about generally parallel axes, the axes being spaced and generally transverse of the direction 16. The sealing jaws 31 engage the tubular bag material 27, transversely seal the bag material 27, and cut the bag material 27 to form discrete bags.

The shafts 32 are driven by control and a motor assembly 44, with the assembly 44 being operable to cause the shafts 32 and supports 45 to have a desired angular velocity profile (determined by the shafts 32). Preferably the control and motor assembly 44 is operable so that the jaws 31 have a peripheral velocity, when adjacent each other to engage the tubular bag material 27, that is less than the velocity in the direction 16 of the tubular bag material 27 at the belts 20. In a further preferred form the jaws 31, when engaged with the tubular bag material 27, can for one or more short periods of time be slowed or even reversed so as to move in a direction opposite the rotational direction 33. This operation of the sealing jaws 31 aids in causing the product to settle towards the lower end of the bag being formed. By urging the product towards the lower end of the bag being formed, the chance of product being engaged between the sealing jaws 31 is reduced. This operation also aids in increasing bag production per minute. When the jaws 31 are engaged with the bag material 27 to form a seal therein, the jaws 31 have the same velocity as the bag material 27 between the jaws 31. Accordingly the bag material 27, by moving with the jaws 31, change in velocity.

The control and motor assembly 34 would include a computer, and a servo motor for each shaft 32, with the computer programmed to operate the servo motor to produce the desired velocity profile.

In the embodiment of FIG. 4, the sub-assemblies 19 each only include the drive pulley 23 and one of the idler rollers (pulleys) 21. The belts 20 pass about the pulleys 23 and idler rollers 21 in the direction 26. As described previously, the drive pulleys 23 would be operated by the control and motor assembly 44 so as to provide the belts 20 with a desired velocity profile. For example the belts 20 may be slowed and/or reversed as discussed with the previous embodiment.

The control and motor assembly 34, and the control and motor assembly 44, may share a computer that controls operation of the servo motors that drive the drive pulleys 23 and the shafts 32, so that the sealing jaws 31 are coordinated with the speed of the tubular bag material 27. However it should also be appreciated that the computer could control the servo motors so that the sealing jaws 31 have a peripheral speed, when adjacent or engaged with the tubular bag material 27, that is different from the velocity provided to the tubular bag material 27 by the belt 20. For example, the jaws 31, and bag material 27 engaged therewith, may have a slower velocity causing product to settle towards the lower end of the bag, with the jaws 31 then increasing in speed when the transverse seal is to be formed in the bag. In another embodiment the jaws 31 may have a velocity opposite the direction of movement of the tubular bag material 27, engaged with the belts 20, when the jaws 31 are adjacent the material 27.

The above embodiments have the advantages of urging the product towards the lower end of the bag being formed by changing the velocity of the bag material 27, that is causing it to vibrate. This increase bag production rates.

The invention claimed is:

1. A method of operating, in combination, a film drive assembly and a packaging machine that receives tubular bag material from the film drive assembly:

the film drive assembly including a plurality of rollers of which one is a drive pulley, and a belt of loop configuration passing about the rollers, so as to be driven thereby, so as to provide a belt drive portion that engages the tubular bag material to move the tubular bag material in a downward predetermined direction at a belt velocity, at the drive assembly, for delivery to the packaging machine below the film drive assembly: the packaging machine including:

a pair of sealing jaws rotatably driven in unison through repeated revolutions in opposite angular directions, the jaws being driven about spaced generally parallel axes generally transverse relative to said direction so as to each have an angular velocity and therefore a peripheral velocity, with the sealing jaws engaging the tubular bag material to transversely seal the tubular bag material to form bags of product; and wherein there are motors operatively associated with the film drive assembly and the packaging machine to cause operation of the belt and sealing jaws, with the combination further including a control operatively associated with the motors to cause operation thereof, wherein the method includes using the control so that the motors drive the belt and jaws to have, prior to sealing contact of the jaws with the tubular bag material when the jaws are adjacent each other to engage the tubular bag material, a relative velocity between the peripheral velocity of the jaws and the belt velocity, and so that, when the jaws are adjacent each other and engaged with the tubular bag material, the belt is either driven in a direction opposite the predetermined direction or slowed, for one or more periods of time to cause vibration of the tubular bag material.

2. The method of claim 1, wherein the belt is driven in a direction opposite said predetermined direction to cause vibration of the tubular bag material.

3. The method of claim 2, wherein the peripheral speed of the jaws changes to at least assist in causing vibration of the tubular bag material.

4. The method of claim 2, wherein the motors include servo motors, with at least one servo motor driving the driven roller, and at least one servo motor driving the sealing jaws, with the control being a computer programmed to operate the servo motors so that belt provides the tubular bag material with said predetermined velocity, the servo motor driving the sealing jaws is operated so that the peripheral velocity of sealing jaws is less than said predetermined velocity.

5. The method of claim 4, wherein said peripheral velocity is in a direction opposite said predetermined direction.

6. The method of claim 1, wherein the peripheral speed of the jaws changes to at least assist in causing vibration of the tubular bag material.

7. The method of claim 6, wherein said peripheral velocity is in a direction opposite said predetermined direction.

8. The method of claim 1, wherein the motors include servo motors, with at least one servo motor driving the driven roller, and at least one servo motor driving the sealing jaws, with the control being a computer programmed to operate the servo motors so that belt provides the tubular bag material with said predetermined velocity, and the servo motor driving the sealing jaws is operated so that the peripheral velocity of sealing jaws is less than said predetermined velocity.

9. The method of claim 1, wherein the belt has a drive surface to frictionally engage the material, the belt moving along a predetermined path including a generally linear first path portion along which the drive surface engages the material, the belt having a plurality of passages extending transversely through the belt from said surface;

a manifold to be subjected to a reduced air pressure and communicating with the passages for at least a part of said path portion so that the passages are subjected to a reduced air pressure so that a difference in air pressure across the material urges the material against said surface at said first path portion;

the drive pulley is engaged with the belt to cause the belt to move along said path in the predetermined direction; and said belt passing between a first one of said plurality of rollers and a second one of said plurality of rollers, to provide said first path portion, with the first and second rollers and drive pulley co-operating to provide a second path portion and a third path portion, with the second and third path portions relative to said first path portion having a direction of extension away from said first path portion.

10. The method of claim 9, wherein the first and second rollers are idler rollers.

11. The method of claim 9, wherein the second and third portions are linear.

12. The method of claim 9, wherein said belt is a first belt, and said assembly includes a second belt, the second belt being generally parallel to the first belt at said first path portion and including a drive surface and a plurality of passages extending transversely of the second belt from the drive surface of the second belt, with the passages of the second belt communicating with the manifold so that the passages of the second belt are also subjected to a reduced air pressure to urge the bag material into engagement with the second belt.

13. The method of claim 12, wherein the second belt passes around a second drive roller and a third and a fourth idler rollers.

14. The method of claim 13, wherein the second drive pulley has a radius, and each of the third and fourth idler rollers has a radius, with the second drive pulley radius being greater than the third and fourth idler roller radius.

15. The method of claim 9, wherein the first idler roller is approximately vertically above the second idler roller.

16. The method of claim 9, wherein the second path portion extends between the second idler roller and the drive pulley of the first belt, with the second path portion extending generally horizontally.

17. The method of claim 9, wherein the drive assembly includes a further idler roller, the further idler roller or rollers urging the belts into engagement with the drive pulleys.

18. The method of claim 1, further including a former; the former including a former shoulder constructed of sheet material providing a hollow and a former lower edge portion, with the former shoulder having an external surface that receives strip bag material to form the strip bag material into tubular bag material that is moved from the former in the predetermined direction; and wherein the rollers include an upper roller and a lower roller, with said upper roller at least partly projecting higher than said lower edge portion.

19. The method of claim 18, wherein the upper roller extends into said hollow.

* * * * *